Aug. 10, 1948.  C. S. SCHROEDER  2,446,854
TRANSMISSION AND CLUTCH ASSEMBLY
Filed April 12, 1944  3 Sheets-Sheet 1
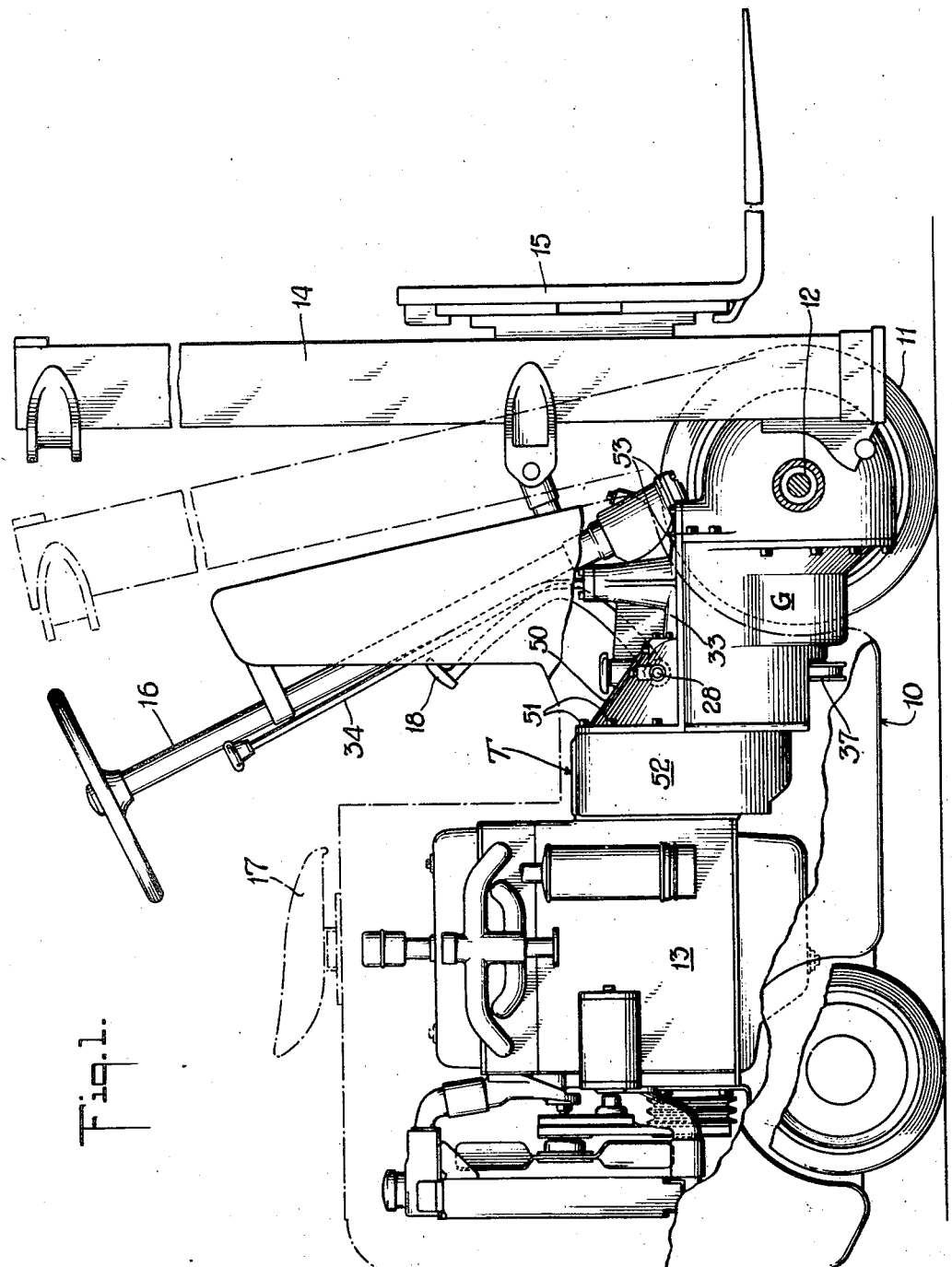
INVENTOR
C. S. Schroeder
BY
A. H. Golden
ATTORNEY

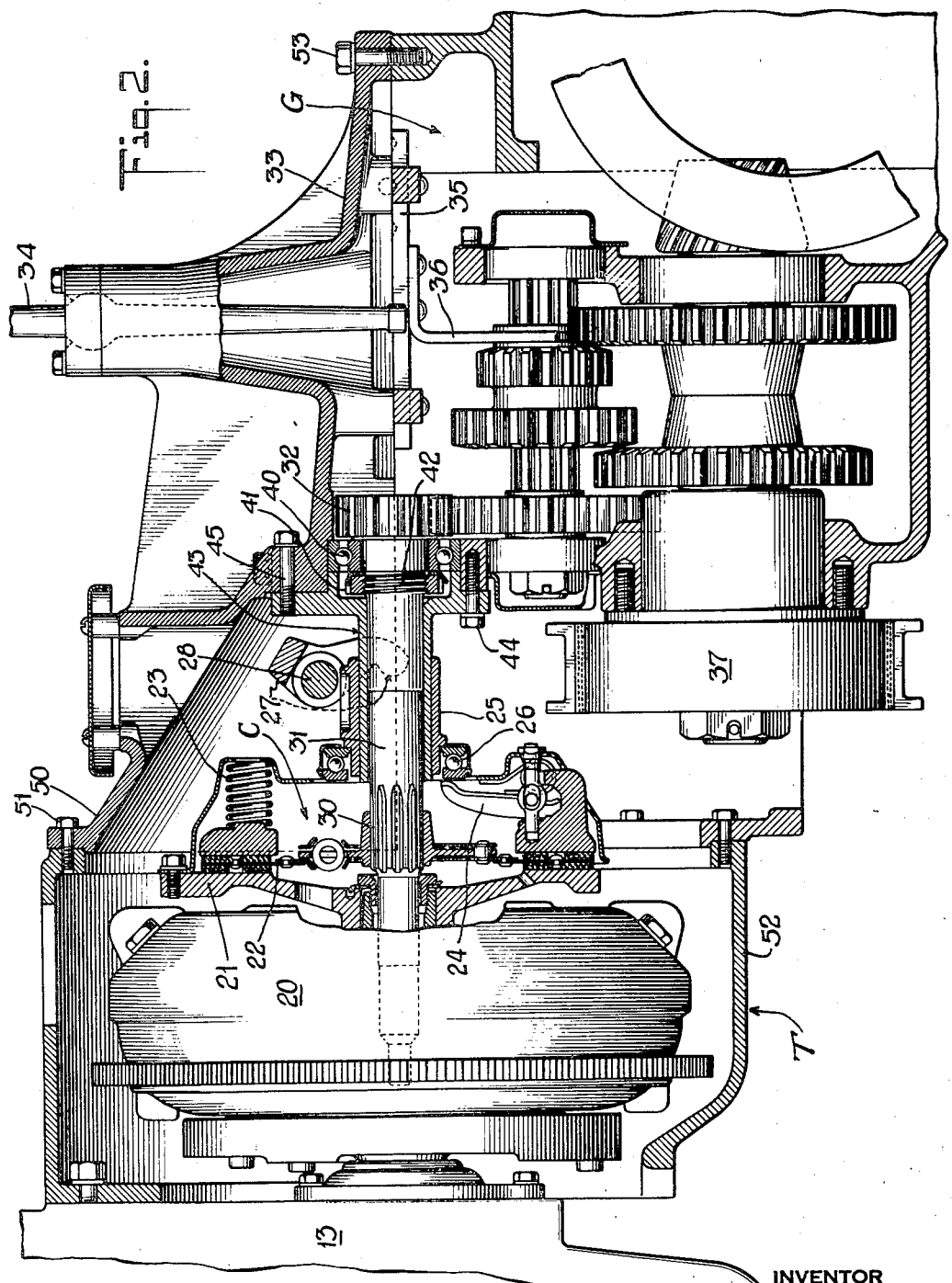

Aug. 10, 1948.     C. S. SCHROEDER     2,446,854
TRANSMISSION AND CLUTCH ASSEMBLY
Filed April 12, 1944     3 Sheets-Sheet 3
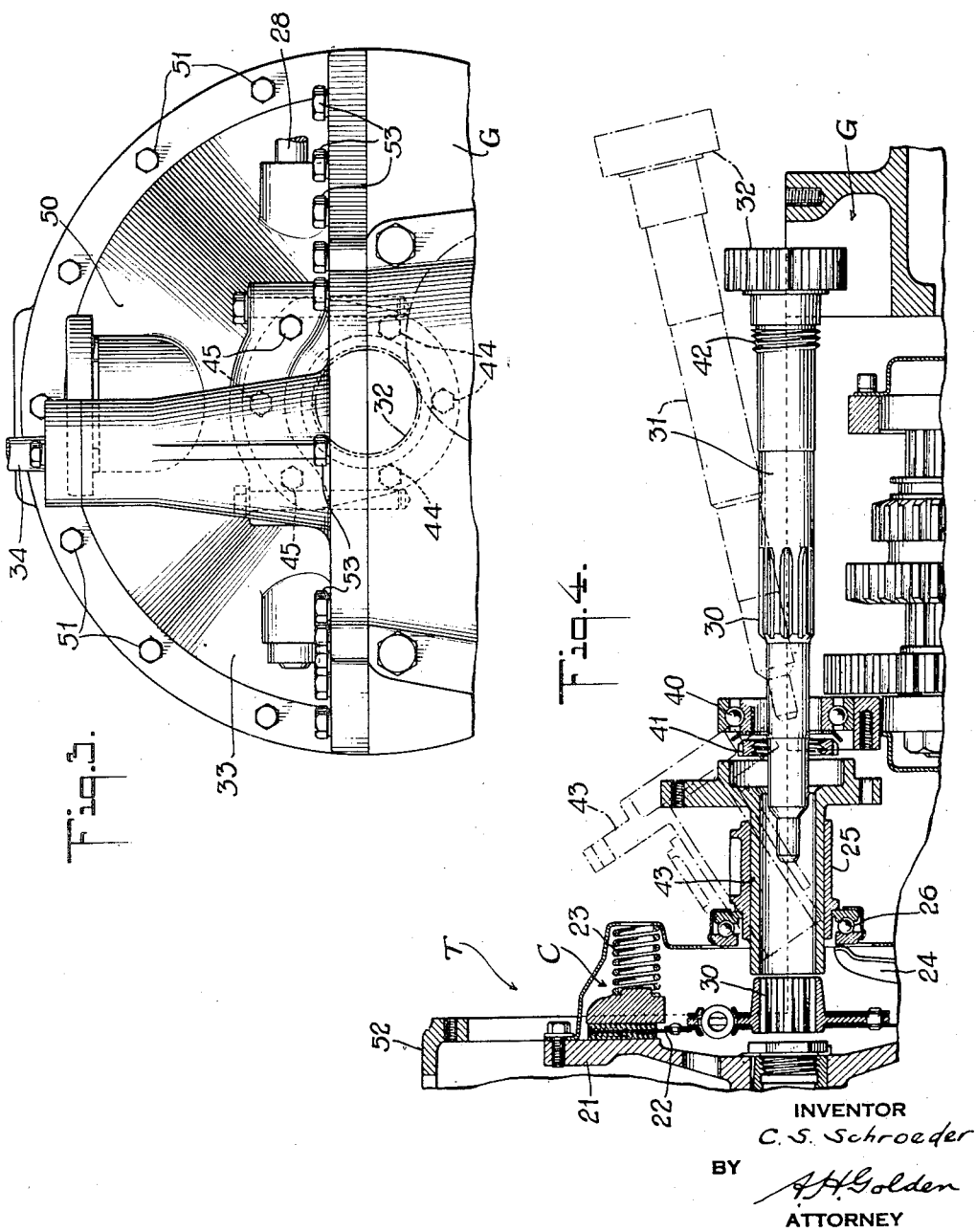
INVENTOR
C. S. Schroeder
BY
A. H. Golden
ATTORNEY Patented Aug. 10, 1948

2,446,854

UNITED STATES PATENT OFFICE 2,446,854

TRANSMISSION AND CLUTCH ASSEMBLY

Charles S. Schroeder, Philadelphia, Pa., assignor to The Yale & Towne Manufacturing Company, Stamford, Conn., a corporation of Connecticut Application April 12, 1944, Serial No. 530,635

8 Claims. (Cl. 192—3.5)

This invention relates to a mechanism forming part of the traction assembly of an industrial truck.

It is customary in industrial trucks to use a traction assembly that comprises a motor, a clutch, and a transmission all adapted to be secured, preferably as a traction unit, to the main frame of the truck. The preferred practice is to mount the assembly or traction unit for rotation about the axis of the traction axles relatively to the main frame, and to accept the drive torque by securing the unit at one or more points against rotation about the axis of the traction axles.

In structures of the particular class, it sometimes becomes necessary to service certain of the parts; as for example, the clutch. In such an event, the transmission gear casing and gears, together with the transmission shaft, must be moved bodily relatively to the clutch and engine, or vice versa. This is an extremely difficult and arduous task and requires much time. Moreover, it requires the rather complete disassembly of the truck and the possible incorrect realignment of the parts when reassembly takes place. This servicing task has been studied for many years with the object of simplifying the operations required, but so far as I know, no satisfactory solution has yet been presented.

My invention provides first, the conception of creating a construction that will not require the disassembly of the parts in the manner I have outlined; and second, the conception of the movement of the transmission shaft axially relatively to the clutch driving that shaft, while the transmission gears actuated by the shaft, together with the clutch, are maintained in their assembled normal operating relationship.

In view of the fact that my invention may best be appreciated after a study of the specification that follows, I deem it unnecessary at this time further to describe generally my invention. It is important to indicate that while I have in the description that follows particularly described the preferred form of the structure I have devised for carrying out my conceptions, it is in the claims that I allude to and describe the scope of my inventions. My claims should thus not be limited by the actual structure herein illustrated and described, since modifications of that structure will readily occur to those skilled in the art.

Referring now to the drawings, Fig. 1 is a general elevation of an industrial truck showing my invention embodied in a traction unit forming part of the truck. Fig. 2 is a vertical section through a portion of the traction unit shown in Fig. 1 in which my invention is operatively incorporated. Fig. 3 is a view looking endwise toward part of the structure of Fig. 2 from the right side of Fig. 2. Fig. 4 is a view of certain of the parts of Fig. 2 in another position thereof.

Referring now more particularly to the drawings, the industrial truck illustrated in Fig. 1 is of that type having a main frame 10 to which is secured a traction unit T for driving traction wheels 11 through a pair of traction axles 12. The traction unit T is suitably mounted for rotation relatively to the main frame 10 about the axis of the traction axles 12, the driving torque being accepted through means securing the engine 13 of the traction unit to the main frame 10 at appropriate points that are not herein illustrated. Tilting uprights 14 are mounted for tilting movement relatively to the truck and are tilted by suitable means that are not herein illustrated. Elevating forks 15 are mounted for movement on the uprights 14 and are actuated by power means also not herein illustrated.

For steering the truck a steering wheel assembly 16 is provided, and is accessible for operation by a driver sitting on a seat 17. Suitable brakes are provided for actuation by the operator, and a clutch is also present and is operated by the pedal 18. It will be well to indicate at this point that the mechanism thus far described is not the invention to be set forth in this application. I have merely set forth the particular parts in order that a better understanding of the invention and its relationship to the art may be had.

Referring now to Figs. 2 and 3, as well as Fig. 1, there is illustrated at 20 a hydraulic drive of the type developed by the Chrysler Corporation and referred to in the patent to Tyken et al. No. 2,342,985. It is the function of this hydraulic drive to rotate the driving portion 21 of the clutch assembly C when motor 13 is operating. Rotation is transmitted from the driving member 21 to the clutch disk 22 in a conventional manner through the frictional engagement of the clutch disk 22 with the driving member 21 under the pressure of the clutch springs 23. Release levers or fingers 24 are provided for relieving friction between the clutch disk 22 and the driving portion 21 of the clutch, all in a conventional manner, through the sliding movement of the clutch throw-out collar 25. The thrust of the clutch throw-out collar 25 is transmitted to fingers 24 through ball bearings 26, and collar 25 is itself moved by a lever 27 secured on shaft 28 and rotated by clutch pedal 18.

The clutch disk 22 is preferably in splined relation at 30 to the drive or transmission shaft 31. The shaft 31 is supported for rotation relatively to the driving clutch member 21 at one end through suitable anti-friction bearing means as is customary in the art and as is well illustrated in the said patent to Tyken et al., to which reference has been made. The other end of the shaft 31 extends into the gear casing G. This other end of the shaft rotates the drive pinion 32, and this drive pinion is in engagement with the transmission gears in casing G through which power is transmitted to a differential, and then to traction axles 12.

The transmission gearing in the gear casing G may be of any conventional type and per se is not my invention here. For the purposes of my invention, it is merely necessary that the gears be arranged so that the pinion 32 may move axially thereof to the right of its position of Fig. 2, as is well illustrated by reference to Fig. 4. This movement of the transmission shaft 31 and pinion 32 is possible, of course, only after certain operations are performed and after the upper cover plate 33 of the gear casing G is removed. It is well to note, at this point, that mounted on the cover plate 33 of the gear casing G is the gear shift lever 34 and its shifter rods 35 and shifter forks 36. It may be well here also to point out that the transmission or emergency brake drum is designated by reference numeral 37 and is well illustrated in Fig. 2.

The right end of the transmission shaft 31 is supported in the forward wall of gear casing G by a ball bearing 40. The transmisison shaft is secured relatively to the bearing 40 by a nut 41 threaded at 42 on the shaft 31 and fitting in thrust relation to the inner race of the bearing. What I term a sleeve member 43 is secured by a series of under bolts 44 to a part of the gear casing, and by bolts 45 to the cover plate 33 of the gear casing. The clutch throw-out collar 25 is mounted for sliding movement on the sleeve 43 and is actuated as has already been described.

In the usual structure of this character known in the prior art, if it is desired to service the clutch C, it is necessary to move the entire gear casing G relatively to the clutch C in order to remove the transmission shaft 31 from the clutch assembly. In the opposite sense, it is necessary to move the engine, fluid drive 20 and clutch C relatively to the drive shaft 31 and the transmission gear casing G if that is the easier operation to reach the clutch for servicing. In accordance with my invention it is not necessary to do either operation, as I shall presently make apparent.

In order to service the clutch in accordance with the teachings of my invention, it is first necessary to remove the gear casing cover plate 33. It will first be noted that the gear casing cover 33 has an upwardly inclined portion 50 that is by a series of bolts 51 secured to the housing 52, in which is mounted the fluid drive 20. The remainder of cover plate 33 is held secured to gear casing G by bolts 53. Therefore, to remove cover plate 33, the bolts 51 are removed, and thereafter the bolts 53 are taken out. The several bolts 45 securing the gear casing cover 33 to the sleeve 43 are also removed. It is now possible to lift off the cover plate 33, and with it the shifter lever 34, the shifter rods 35, and shifter forks 36.

It is now possible to remove the several bolts 44 so as to completely release sleeve 43 for sliding movement from the position of Fig. 2 to the full line position of Fig. 4. Sliding of sleeve 43 to the position of Fig. 4 makes possible access to the nut 41 screwed on to the transmission shaft 31 at 42. Release rotation of the nut 41 will allow its movement as to the position of Fig. 4 and will free shaft 31. There is now nothing to prevent sliding movement of the transmission shaft 31 and the pinion 32 to the right from the position of Fig. 2 to the solid line position of Fig. 4. Naturally, in the position of the parts in Fig. 4, it is possible to remove completely the transmission shaft 31 as shown in dash and dotted lines, and to remove also the sleeve 43 and with it the clutch throw-out collar 25, and thrust bearing 26.

The entire clutch assembly C now becomes accessible for servicing in exactly the same manner as though, in accordance with the teachings of the prior art, the entire gear casing and transmission shaft 31 had been moved to the right from the position of Fig. 2, or if the engine 13 and clutch assembly C had been moved to the left from the position of Fig. 2. Those skilled in the art will fully appreciate the great value and utility of my invention and the manner in which it obviates completely a long and arduous servicing task.

I now claim:

1. In a combination of the class described, a clutch assembly of the general type having a driving member and a driven clutch disk adapted to be spring pressed relatively to the driving member by a pressure member and release fingers for relieving the pressure of said pressure member, a gear casing secured in normal operating relation to said clutch assembly and having gears therein, a transmission shaft having one end passing into said clutch assembly, the other end of said transmission shaft extending into said gear casing, means whereby the said other end of said shaft drives the gears therein, a bearing in said gear casing mounting said transmission shaft for rotation in operative relation to said clutch and gears whereby to transmit rotation to said gears, a cap secured to said casing and having a sleeve portion fitting about said shaft, a throw-out collar mounted about said cap sleeve portion for transmitting motion to said release fingers, and said transmission shaft being movable axially of its length out of said clutch assembly into position to allow bodily tilting thereof relatively to said throw-out collar and said cap sleeve.

2. In a combination of the class described, a clutch assembly of the general type having a driving member and a driven clutch member adapted to be spring pressed relatively to the driving member by a pressure member, a gear casing secured in normal operating relation tc said clutch assembly and having gears therein, a transmission shaft having one end passing centrally into said clutch assembly and in splined relation to said clutch member, a drive pinion on the other end of said transmission shaft in said gear casing for driving the gears therein, an anti-friction bearing in said gear casing mounting said transmission shaft for rotation relatively to said gear casing, a nut threaded about said shaft and securing said shaft against movement axially thereof inwardly of said transmission casing and out of splined relation to said clutch member while said clutch assembly and gear casing are maintained in normal operating relation, said gears and gear casing being positioned and formed to allow said axial movement of the transmission shaft inwardly of said casing when said nut is removed.

3. In a combination of the class described, a clutch assembly of the general type having a driving member and a driven clutch disk adapted to be spring pressed relatively to the driving member by a pressure member and release fingers for relieving the pressure of said pressure member, a gear casing secured in normal operating relation to said clutch assembly and having gears therein, a transmission shaft having one end passing into said clutch assembly and in splined relation to said clutch disk, a drive pinion on the other end of said transmission shaft in said gear casing for driving the gears therein, an anti-friction bearing in said gear casing mounting said transmission shaft for rotation relatively to said gear casing, a nut threaded about said shaft and securing said shaft against movement axially thereof inwardly of said transmission casing and out of splined relation to said clutch disk while said clutch assembly and gear casing are maintained in normal operating relation, said gears and gear casing being positioned and formed for axial movement of the transmission shaft inwardly into said casing when said nut is removed, a sleeve surrounding said transmission shaft and bolted to said gear casing in covering relation to said nut, a clutch throw-out collar slidable on said sleeve for transmitting motion to said release fingers, the said axial movement of said transmission shaft into said gear casing allowing removal of said collar and sleeve endwise from said shaft.

4. In a combination of the class described, a clutch assembly of the general type having a driving member and driven clutch member adapted to be spring pressed relatively to the driving member by a pressure member, and release fingers for relieving the pressure of said pressure member, a gear casing having a forward and a rearward wall and secured in normal operating relation to said clutch assembly, gears in said casing, a transmission shaft having one end passing centrally into said clutch assembly and in operative relation to said clutch member, a drive pinion on the other end of said transmission shaft in said gear casing for driving the gears therein, an anti-friction bearing in the forward wall of said gear casing mounting said transmission shaft for rotation relatively to said gear casing, a nut threaded about said shaft and securing said shaft against movement axially thereof inwardly of said gear casing and out of operative relation to said clutch member while said clutch assembly and gear casing are maintained in normal operating relation, said gears and gear casing being positioned and formed to allow said axial movement of the transmission shaft inwardly of said casing when said nut is removed, said shaft striking the rear wall of the gear casing prior to its movement entirely within said gear casing, a sleeve surrounding said transmission shaft and bolted to said gear casing in covering relation to said nut, a clutch throw-out collar slidable on said sleeve, a bearing on said collar for transmitting motion to said release fingers, the axial movement of said transmission shaft allowing removal of said collar and sleeve from said shaft through subsequent bodily tilting movement of said shaft, a cover plate for said transmission, and bolts securing said sleeve also to said cover plate.

5. In a combination of the class described, a clutch assembly of the general type having a driving member and a driven clutch disk adapted to be spring pressed relatively to the driving member by a pressure member and release fingers for relieving the pressure of said pressure member, a gear casing having front and rear walls and secured in normal operating relation to said clutch assembly, a removable top cover for said casing, gears in said casing, a transmission shaft having one end passing into said clutch assembly, the other end of said transmission shaft extending into said gear casing through the front wall thereof and terminating just inwardly of said front wall, a pinion on the said shaft for driving the gears in said casing, a bearing on the front wall of said casing for said transmission shaft, means securing said shaft against sliding relatively to said bearing, a cap for said bearing and said securing means, means securing said cap to said gear casing, said cap having a sleeve extending forwardly about said shaft, a throwout collar mounted about said sleeve for transmitting motion to said release fingers, and said cap and shaft securing means being demountable to release said shaft for movement axially of its length out of said clutch assembly and into said gear casing for bodily tilting upwardly through the top of said gear casing whereby to remove said shaft from its position between said clutch assembly and gears.

6. In a combination of the class described, a clutch assembly of the general type having a driving member and a driven clutch disk adapted to be spring pressed relatively to the driving member by a pressure member, a gear casing formed with forward and rear walls and secured in normal operating relation to said clutch assembly, gears in said casing, a transmission shaft having one end passing into said clutch assembly and in splined relation to said clutch plate, a drive pinion on the other end of said transmission shaft extending into said gear casing for driving the transmission gears therein, a bearing for said shaft in the forward wall of said gear casing, means secured to the forward wall of said gear casing for covering said bearing, holding means holding said shaft against endwise movement on said bearing and maintaining said pinion in operative relation to said gears, and said holding means and said covering means being releasable to release said shaft for movement axially of its length inwardly of said gear casing and out of splined relation to said clutch disk while said clutch assembly and gear casing are maintained in their normal operating relation.

7. In a combination of the class described, a clutch assembly, a gear casing having forward and rear walls and secured in normal operating relation to said clutch assembly, gears in said gear casing, a transmission shaft having one end passing into said clutch assembly, the other end of said transmission shaft extending into said gear casing through said forward wall thereof and terminating in a drive pinion just inwardly of said forward wall whereby said shaft drives the gears in said casing, bearing means on the forward wall of said gear casing mounting said transmission shaft for rotation in operative relation to said clutch and gears, holding means holding said shaft against movement axially relatively to said bearing means inwardly of said gear casing, said gear casing being formed to allow axial movement of said shaft toward the rear wall of said gear casing when said shaft is released from said holding means, whereby the release of said holding means frees said shaft for sliding movement axially of its length from said clutch assembly and into said gear casing while said clutch assembly and gear casing are maintained in their normal operating relation.

8. In a truck of the class described, a main frame, a traction unit secured to said main frame, said traction unit comprising a clutch assembly and a gear casing secured in normal operating relation to said clutch assembly and having gears therein, said gear casing having a forward and a rear wall and a top opening, a cover for said opening, a transmission shaft having one end passing into said clutch assembly, the other end of said transmission shaft extending into said gear casing through the forward wall thereof and terminating short of said rear wall, means whereby said shaft drives the gears in said casing, a bearing in said gear casing mounting said transmission shaft for rotation in operative relation to said clutch and gears, said gear casing being formed for endwise movement of said shaft out of said clutch assembly and inwardly of said gear casing toward said rear wall, said shaft being longer than the distance between said walls so that it must be tilted upwardly to be removed endwise from said bearing, and the said shaft having a portion of relatively smaller diameter than that portion thereof normally within said bearing, said portion of smaller diameter moving into said bearing upon endwise movement of said shaft whereby to allow said tilting movement of said shaft, and means for holding said shaft normally against endwise movement relatively to said bearing.

CHARLES S. SCHROEDER.

REFERENCES CITED

The following references are of record in the file of this patent:

UNITED STATES PATENTS

| Number | Name | Date |
|---|---|---|
| 920,841 | Remington et al. | May 4, 1909 |
| 1,495,604 | Lipe et al. | May 27, 1924 |
| 1,538,034 | Frey | May 19, 1925 |
| 1,767,566 | Updike | June 24, 1930 |
| 1,900,305 | Schoenrock | Mar. 7, 1933 |
| 2,045,011 | Griswold | June 23, 1936 |
| 2,055,177 | Lyman | Sept. 22, 1936 |
| 2,074,820 | White et al. | Mar. 23, 1937 |
| 2,082,826 | Frisby | June 8, 1937 |
| 2,131,579 | Bear | Sept. 27, 1938 |
| 2,227,742 | Backus | Jan. 7, 1941 |
| 2,349,064 | Weaver | May 16, 1944 |